(12) United States Patent
Sato

(10) Patent No.: US 12,141,456 B2
(45) Date of Patent: Nov. 12, 2024

(54) CALCULATOR AND MEMORY CONTROL METHOD

(71) Applicant: Toshiba Tec Kabushiki Kaisha, Tokyo (JP)

(72) Inventor: Naoya Sato, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 2 days.

(21) Appl. No.: 18/156,207

(22) Filed: Jan. 18, 2023

(65) Prior Publication Data

US 2023/0384956 A1 Nov. 30, 2023

(30) Foreign Application Priority Data

May 25, 2022 (JP) .................. 2022-085362

(51) Int. Cl.
*G06F 3/06* (2006.01)
(52) U.S. Cl.
CPC .......... *G06F 3/0635* (2013.01); *G06F 3/0608* (2013.01); *G06F 3/0685* (2013.01)
(58) Field of Classification Search
CPC .... G06F 3/0635; G06F 3/0608; G06F 3/0685; G06F 2212/1016; G06F 2212/261; G06F 2212/502; G06F 2212/601; G06F 2212/657; G06F 12/08
USPC .................................. 711/158, 154
See application file for complete search history.

(56) References Cited

U.S. PATENT DOCUMENTS

2017/0228012 A1\* 8/2017 Shirota ................ G06F 1/329
2019/0294363 A1\* 9/2019 Caraccio ............. G06F 3/0649

FOREIGN PATENT DOCUMENTS

JP  H03-40150 A  2/1991

\* cited by examiner

*Primary Examiner* — David Yi
*Assistant Examiner* — Zubair Ahmed
(74) *Attorney, Agent, or Firm* — Kim & Stewart LLP

(57) ABSTRACT

According to an embodiment, a calculator searches for an auxiliary storage device connected to the calculator. If a plurality of auxiliary storage devices are found as a result of the search, the calculator measures a write speed of each of the plurality of auxiliary storage devices. The calculator sets a degree of priority to preferentially utilize a swap space of an auxiliary storage device having a higher write speed. The calculator activates the swap space in accordance with the degree of priority.

8 Claims, 7 Drawing Sheets

Fig.6

| Swap space | Write speed | Integration ID | Integration speed | Degree of priority | Free space | Free space |
|---|---|---|---|---|---|---|
| /mnt1/swapfile | 180 | 1 | 300.8 | 90 | 125GB | 90GB |
| /mnt2/swapfile | 196 | 1 | 300.8 | 90 | 100GB | 90GB |
| /mnt3/swapfile | 80 | 2 | 80 | 80 | 30GB | 27GB |
| /mnt4/swapfile | 1500 | 3 | 1500 | 100 | 120GB | 108GB |

209

```
(snip)
# <file system>  <mount point> <type> <option>        <dump> <pass>
/mnt1/swapfile    none          swap   defaults,pri=90   0    0
/mnt2/swapfile    none          swap   defaults,pri=90   0    0
/mnt3/swapfile    none          swap   defaults,pri=80   0    0
/mnt4/swapfile    none          swap   defaults,pri=100  0    0
```

Fig.7

CALCULATOR AND MEMORY CONTROL METHOD

CROSS-REFERENCE TO RELATED APPLICATIONS

This application is based upon and claims the benefit of priority from the prior Japanese Patent Application No. 2022-085362, filed on May 25, 2022, the entire contents of which are incorporated herein by reference.

FIELD

An embodiment described herein generally relates to a calculator, a memory control method, and a memory control program.

BACKGROUND

In general, a calculator including a central processing unit (CPU) and a main storage device (main memory) uses an auxiliary storage device that stores an operating system (OS) and programs. When a plurality of programs are simultaneously used, the main storage device may be short of space. To cope with this, there is a technique of allocating a swap space to the auxiliary storage device and temporarily evacuating the contents currently not used of the main storage device to the swap space of the auxiliary storage device.

BRIEF DESCRIPTION OF THE DRAWINGS

FIG. 6 is a diagram showing exemplary contents of a benchmark result file according to the embodiment.

FIG. 7 is a diagram showing contents relating to an exemplary swap space of a /etc/fstab file according to the embodiment.

DETAILED DESCRIPTION

According to an embodiment, a calculator is connectable with an auxiliary storage device that can include a swap space, and performs predetermined processing. The calculator includes a main memory and a processor. The main memory temporarily stores a program and data necessary for the predetermined processing. The processor executes the program temporarily stored in the main memory to process the data, and causes the main memory to store the processed data. The processor searches for the auxiliary storage device connected to the calculator. If a plurality of auxiliary storage devices are found as the auxiliary storage device connected to the calculator as a result of the search, the processor measures a write speed of each of the plurality of auxiliary storage devices. The processor sets a degree of priority to preferentially utilize a swap space of an auxiliary storage device having a higher write speed. Further, the processor activates the swap space in accordance with the degree of priority.

Configuration (Hardware Configuration)

Figure 1:
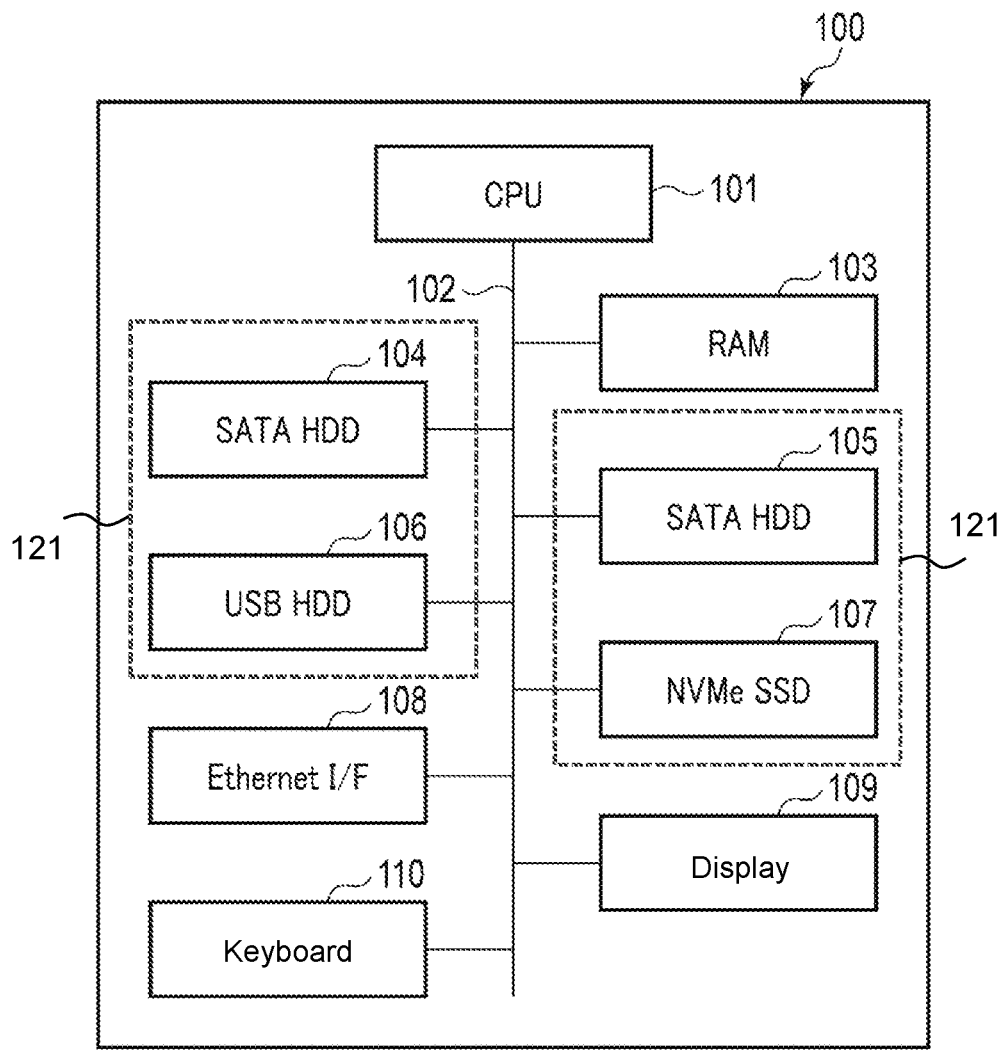
FIG. 1 is a block diagram showing a hardware configuration of a calculator according to an embodiment.

First, a hardware configuration of a calculator 100 according to an embodiment will be described with reference to FIG. 1. FIG. 1 is a block diagram showing the hardware configuration of the calculator 100 according to the embodiment. The calculator 100 is, for example, a computer. The computer is a personal computer, a server computer, or the like.

Here, description will be given on a calculator 100 including a plurality of auxiliary storage devices (see auxiliary storage devices 121 to be described later) connected thereto. In other words, the calculator 100 includes a plurality of auxiliary storage devices.

As shown in FIG. 1, the calculator 100 includes a central processing unit (CPU) 101, a system bus 102, a random access memory (RAM) 103, a serial advanced technology attachment (SATA) hard disk drive (HDD) 104, a SATA hard disk drive (HDD) 105, a universal serial bus (USB) hard disk drive (HDD) 106, a non-volatile memory express (NVMe) solid state drive (SSD) 107, an Ethernet (registered trademark) interface (I/F) 108, a display 109, and a keyboard 110. The calculator 100 may include other peripheral devices in addition to the above components.

The CPU 101, the RAM 103, the SATA hard disk drive 104, the SATA hard disk drive 105, the USB hard disk drive 106, the NVMe solid state drive 107, the Ethernet interface 108, the display 109, and the keyboard 110 are electrically connected to each other via the system bus 102 and exchange data and instructions via the system bus 102.

The CPU 101 is a processor and is hardware that executes programs and processes data. The CPU 101 sequentially executes a series of instructions (programs) stored in the RAM 103. Thus, the CPU 101 reads data from the RAM 103 to process the data, and writes the processed data to the RAM 103, for example.

The RAM 103 is a main storage device (main memory) that temporarily stores programs and data. The RAM 103 temporarily stores programs and data necessary for the CPU 101 to currently execute processing.

The CPU 101 executes programs to control the RAM 103, the SATA hard disk drive 104, the SATA hard disk drive 105, the USB hard disk drive 106, the NVMe solid state drive 107, the Ethernet interface 108, the display 109, and the keyboard 110.

The display 109 is an output device that outputs data. The display 109 presents various types of information to a user.

The keyboard 110 is an input device that receives instructions and data. The keyboard 110 receives instructions and data in response to the operation of a user.

The Ethernet interface 108 is an interface for connecting to a network or other calculators. For example, the calculator 100 is connectable to a network or other calculators via the Ethernet interface 108.

The SATA hard disk drives 104 and 105, the USB hard disk drive 106, and the NVMe solid state drive 107 are each an auxiliary storage device that stores data permanently. In the following description, the drives 104 to 107 may be referred to as auxiliary storage devices 121. The SATA hard disk drives 104 and 105 are hard disk drives conforming to the SATA connection standard. The USB hard disk drive 106 is a hard disk drive conforming to the USB connection standard. The NVMe solid state drive 107 is a solid state drive conforming to the NVMe connection standard. The SATA hard disk drives 104 and 105, the USB hard disk drive 106, and the NVMe solid state drive 107 are each a block device.

As described above, the SATA hard disk drives 104 and 105, the USB hard disk drive 106, and the NVMe solid state drive 107 are each the auxiliary storage device 121 that can include a swap space. In other words, the SATA hard disk drives 104 and 105, the USB hard disk drive 106, and the NVMe solid state drive 107 are each capable of providing a virtual memory area for storing part of the data currently stored in the RAM 103 when the RAM 103 is short of space.

The calculator 100 according to the embodiment operates by the OS of Linux (registered trademark). The SATA hard disk drive 104 is a primary drive and stores the OS of Linux. The calculator 100 operates when the CPU 101 reads the OS of Linux from the SATA hard disk drive 104 to the RAM 103 and executes the OS at the time of power-on.

Further, the SATA hard disk drive 104 stores a memory control program for the calculator 100. After the activation of the OS of Linux, the CPU 101 reads the memory control program from the SATA hard disk drive 104 to the RAM 103 and executes the memory control program. The memory control program optimizes the swap spaces of the SATA hard disk drives 104 and 105, the USB hard disk drive 106, and the NVMe solid state drive 107.

(Software Configuration)

Figure 2:
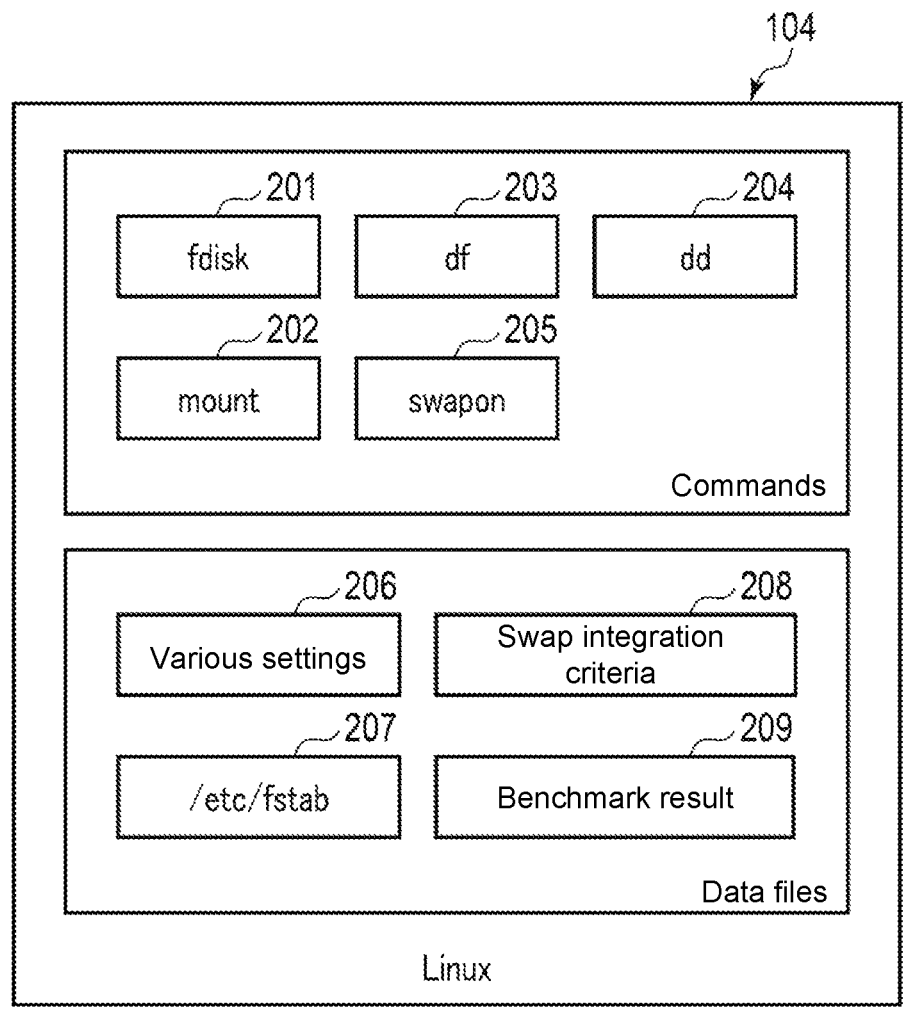
FIG. 2 is a diagram showing a software configuration of a memory control program of the calculator according to the embodiment.

Next, a software configuration of the memory control program stored in the SATA hard disk drive 104 will be described with reference to FIG. 2. FIG. 2 is a diagram schematically showing a software configuration of the memory control program stored in the SATA hard disk drive 104.

The memory control program stored in the SATA hard disk drive 104 includes commands and data files.

The commands include a fdisk command 201, a mount command 202, a df command 203, a dd command 204, and a swapon command 205.

The data files include a various settings file 206, a /etc/fstab file 207, a swap integration criteria table 208, and a benchmark result file 209.

Operation

Figure 3:
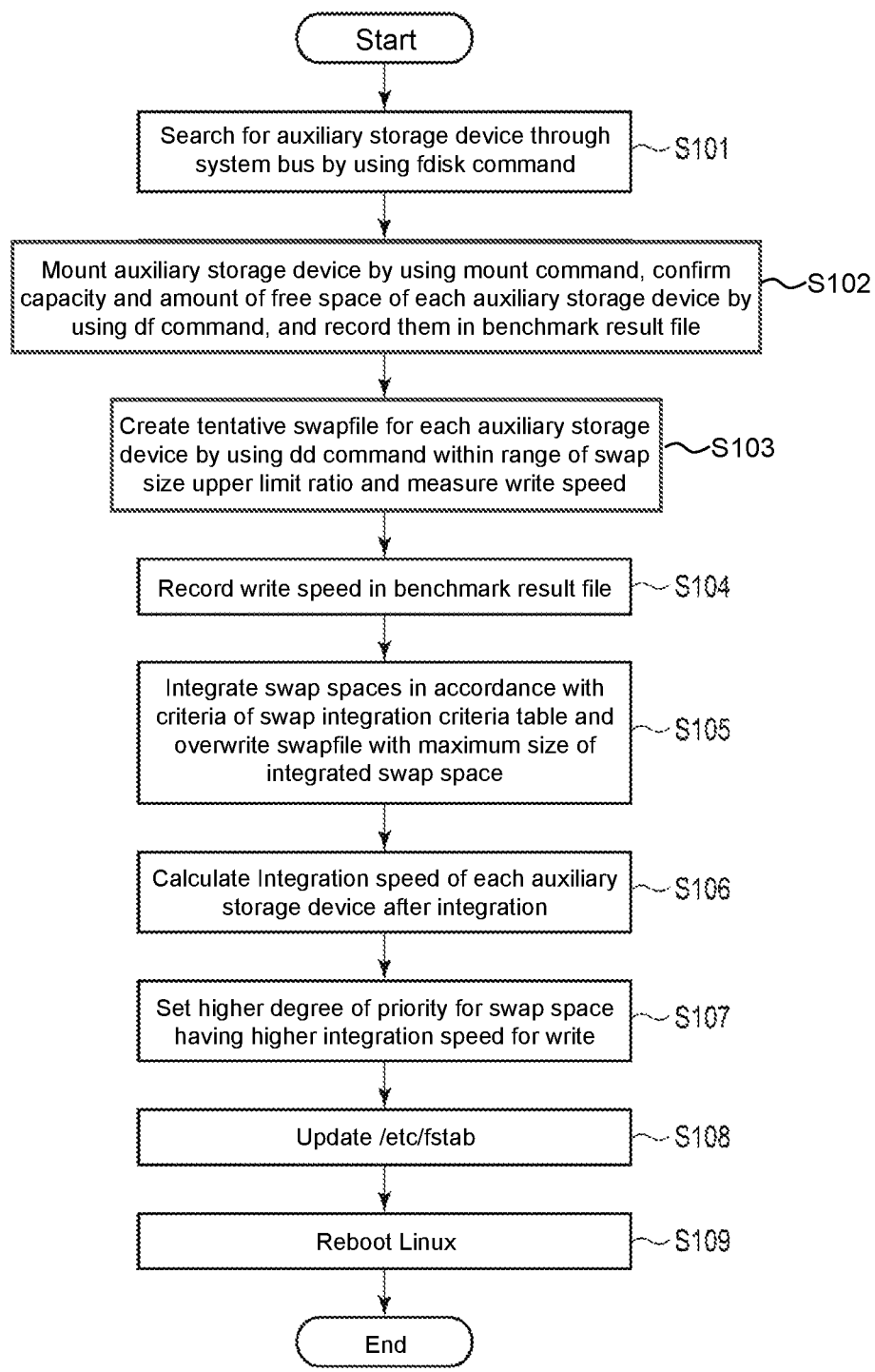
FIG. 3 is a flowchart showing memory control executed by the calculator according to the embodiment.

Next, the memory control in the calculator 100 will be described with reference to FIGS. 3 to 7. FIG. 3 is a flowchart showing the memory control in the calculator 100. The memory control is performed when the CPU 101 executes the memory control program stored in the RAM 103.

Figure 4:
FIG. 4 is a diagram showing exemplary contents of a various settings file according to the embodiment.
Figure 5:
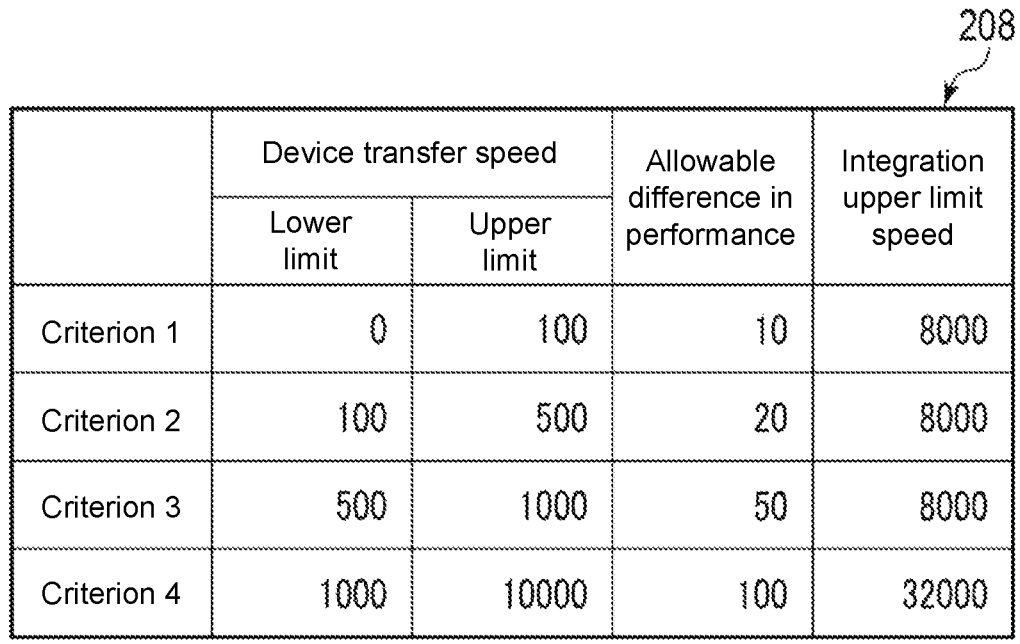
FIG. 5 is a diagram showing exemplary contents of a swap integration criteria table according to the embodiment.

FIG. 4 is a diagram showing exemplary contents of the various settings file 206. FIG. 5 is a diagram showing exemplary contents of the swap integration criteria table 208. FIG. 6 is a diagram showing exemplary contents of the benchmark result file 209. FIG. 7 is a diagram showing contents relating to an exemplary swap space of the /etc/fstab file 207.

In Step S101 of FIG. 3, the CPU 101 searches for an auxiliary storage device 121 through the system bus 102 by using the fdisk command 201. In other words, the CPU 101 searches for an auxiliary storage device 121 from among peripheral devices connected to the system bus 102.

In the embodiment, specifically, the SATA hard disk drive 104, the SATA hard disk drive 105, the USB hard disk drive 106, and the NVMe solid state drive 107 are found as the auxiliary storage devices 121 by the search in Step S101.

In Step S102, the CPU 101 mounts the found auxiliary storage devices 121 by using the mount command 202. The CPU 101 then confirms the capacity and the amount of free space of each auxiliary storage device 121 by using the df command 203. Subsequently, the CPU 101 records the capacity and the amount of free space of each auxiliary storage device 121 in the benchmark result file 209.

In the embodiment, specifically, the CPU 101 mounts the SATA hard disk drive 104, the SATA hard disk drive 105, the USB hard disk drive 106, and the NVMe solid state drive 107, which are the auxiliary storage devices 121 found in Step S101.

Next, the CPU 101 confirms the capacity and the amount of free space of each of the SATA hard disk drive 104, the SATA hard disk drive 105, the USB hard disk drive 106, and the NVMe solid state drive 107 and records the capacity and the amount of free space of each of those components in the benchmark result file 209.

FIG. 6 shows exemplary contents of the benchmark result file 209. The benchmark result file 209 includes items of swap space, write speed, integration ID, integration speed, degree of priority, free space, and maximum size. The unit for the values of the write speed and integration speed is MiB/s. The benchmark result file 209 includes an item of capacity, which is omitted in FIG. 6.

The swap space includes items of /mnt1/swapfile, /mnt2/swapfile, /mnt3/swapfile, and /mnt4/swapfile. The items of /mnt1/swapfile, /mnt2/swapfile, /mnt3/swapfile, and /mnt4/swapfile represent the swap spaces of the SATA hard disk drive 104, the SATA hard disk drive 105, the USB hard disk drive 106, and the NVMe solid state drive 107, respectively.

The items of /mnt1/swapfile, /mnt2/swapfile, /mnt3/swapfile, and /mnt4/swapfile are set on the basis of the various settings file 206 shown in FIGS. 2 and 4. The various settings file 206 includes a setting name and a setting value as shown in FIG. 4. The setting name includes a swap size upper limit ratio, a performance estimation correction value, a swap file name, and a swap file path.

In the swap file path, /mnt* represents /mnt1, /mnt2, /mnt3, and /mnt4. The /mnt1, /mnt2, /mnt3, and /mnt4 represent the swap file paths of the SATA hard disk drive 104, the SATA hard disk drive 105, the USB hard disk drive 106, and the NVMe solid state drive 107, respectively.

The CPU 101 records the amounts of free space of the SATA hard disk drive 104, the SATA hard disk drive 105, the USB hard disk drive 106, and the NVMe solid state drive 107 in the benchmark result file 209 shown in FIG. 6.

In the example of the benchmark result file 209 of FIG. 6, the amount of free space of the SATA hard disk drive 104 is 125 GB, the amount of free space of the SATA hard disk drive 105 is 100 GB, the amount of free space of the USB hard disk drive 106 is 30 GB, and the amount of free space of the NVMe solid state drive 107 is 120 GB.

Furthermore, the CPU 101 multiplies the amount of free space by a swap size upper limit ratio of the various settings file 206 to calculate the maximum size, and records the maximum size in the benchmark result file 209.

The benchmark result file 209 of FIG. 6 shows the contents ultimately obtained in the processing of memory control. After the processing of Step S102, all the values of the items for swap space except the items of free space and maximum size, that is, the values of the items of write speed, integration ID, integration speed, and degree of priority have null values (for example, zero).

In the benchmark result file 209 of FIG. 6, the maximum size of each of the swap spaces (/mnt1/swapfile and /mnt2/swapfile) of the SATA hard disk drive 104 and the SATA hard disk drive 105 is 90 GB, the maximum size of the swap space (/mnt3/swapfile) of the USB hard disk drive 106 is 27 GB, and the maximum size of the swap space (/mnt4/swapfile) of the NVMe solid state drive 107 is 108 GB.

The values of the SATA hard disk drive 105, the USB hard disk drive 106, and the NVMe solid state drive 107 coincide with the values obtained by multiplying the respective amounts of free space by the swap size upper limit ratio. In contrast, the value of the SATA hard disk drive 104 differs from the value obtained by multiplying the amount of free space by the swap size upper limit ratio. This is because the swap space of the SATA hard disk drive 104 and the swap space of the SATA hard disk drive 105 are integrated as will be described later. This is also because a larger maximum size of the swap space (/mnt1/swapfile) of the SATA hard disk drive 104 is adjusted to a smaller maximum size of the swap space (/mnt2/swapfile) of the SATA hard disk drive 105 along with the integration. Additionally, the maximum size of the swap space (/mnt1/swapfile) of the SATA hard disk drive 104 in the benchmark result file 209 at that time is 112.5 GB.

In Step S103 of FIG. 3, the CPU 101 creates a tentative swap file (swapfile) for each auxiliary storage device 121 within the range of the swap size upper limit ratio in the various settings file 206 of FIG. 2 by using the dd command 204, and measures a write speed.

In the embodiment, specifically, the CPU 101 creates a tentative swap file (swapfile) for each of the SATA hard disk drive 104, the SATA hard disk drive 105, the USB hard disk drive 106, and the NVMe solid state drive 107. The tentative swap files (swapfile) of the SATA hard disk drive 104, the SATA hard disk drive 105, the USB hard disk drive 106, and the NVMe solid state drive 107 correspond to /mnt1/swapfile, /mnt2/swapfile, /mnt3/swapfile, and /mnt4/swapfile of the swap spaces in the benchmark result file 209 of FIG. 6, respectively.

Next, the CPU 101 measures the write speed of the tentative swap file (swapfile) of each of the SATA hard disk drive 104, the SATA hard disk drive 105, the USB hard disk drive 106, and the NVMe solid state drive 107.

In Step S104, the CPU 101 records the measured write speed of each auxiliary storage device 121 in the benchmark result file 209.

In the embodiment, as shown in FIG. 6, the write speed of the SATA hard disk drive 104 is 180 (MiB/s), the write speed of the SATA hard disk drive 105 is 196 (MiB/s), the write speed of the USB hard disk drive 106 is 80 (MiB/s), and the write speed of the NVMe solid state drive 107 is 1500 (MiB/s).

In Step S105, the CPU 101 integrates the swap spaces in accordance with the criteria of the swap integration criteria table 208 shown in FIG. 5, and overwrites the swap file (swapfile) with the maximum size of the integrated swap space.

As shown in FIG. 5, the swap integration criteria table 208 includes items of device transfer speed, allowable difference in performance, and integration upper limit speed. The item of device transfer speed further includes items of lower limit and upper limit. In addition, the swap integration criteria table 208 includes items of criterion 1, criterion 2, criterion 3, and criterion 4 for each of the items of device transfer speed, allowable difference in performance, and integration upper limit speed. The items of criterion 1, criterion 2, criterion 3, and criterion 4 have values of the items of device transfer speed, allowable difference in performance, and integration upper limit speed.

The values of criterion 1 to criterion 4 are each a numerical value indicating the speed. The values of criterion 1 to criterion 4 have the units of MiB/s. The upper limit of the device transfer speed is assumed to be less than that value.

The criterion 1, criterion 2, criterion 3, and criterion 4 of the swap integration criteria table 208 of FIG. 5 represent the criteria of the SATA hard disk drive 104, the SATA hard disk drive 105, the USB hard disk drive 106, and the NVMe solid state drive 107, respectively.

The CPU 101 integrates the swap spaces in accordance with the criteria of the swap integration criteria table 208 of FIG. 5. To integrate the swap spaces means that the swap spaces of the plurality of auxiliary storage devices 121 falling within the range of the allowable difference in performance in the swap integration criteria table 208 are combined into a single swap space for page allocation by a round-robin method, and are handled as a single integrated auxiliary storage device 121. The allowable difference in performance means a difference in write speed, which allows each auxiliary storage device 121 to integrate the swap spaces with another auxiliary storage device 121.

In the embodiment, as described above (see FIG. 6), the write speed of the SATA hard disk drive 104 is 180 (MiB/s), the write speed of the SATA hard disk drive 105 is 196 (MiB/s), the write speed of the USB hard disk drive 106 is 80 (MiB/s), and the write speed of the NVMe solid state drive 107 is 1500 (MiB/s).

As shown in the swap integration criteria table 208 of FIG. 5, the allowable difference in performance of the SATA hard disk drive 104 is 10 (MiB/s), the allowable difference in performance of the SATA hard disk drive 105 is 20 (MiB/s), the allowable difference in performance of the USB hard disk drive 106 is 50 (MiB/s), and the allowable difference in performance of the NVMe solid state drive 107 is 100 (MiB/s).

From those numerical values, the swap space of the SATA hard disk drive 104 and the swap space of the SATA hard disk drive 105 can be integrated. Meanwhile, the swap space of the USB hard disk drive 106 fails to be integrated with the swap space of any auxiliary storage device 121 of the SATA hard disk drive 104, the SATA hard disk drive 105, and the NVMe solid state drive 107. Similarly, the swap space of the NVMe solid state drive 107 also fails to be integrated with the swap space of any auxiliary storage device 121 of the SATA hard disk drive 104, the SATA hard disk drive 105, and the USB hard disk drive 106.

In the embodiment, the CPU 101 integrates the swap space of the SATA hard disk drive 104 and the swap space of the SATA hard disk drive 105. In other words, the CPU 101 combines the swap space (/mnt1/swapfile) of the SATA hard disk drive 104 and the swap space (/mnt2/swapfile) of the SATA hard disk drive 105 into a single swap space for page allocation by a round-robin method. In other words, the CPU 101 handles the SATA hard disk drive 104 and the SATA hard disk drive 105 as a single integrated auxiliary storage device 121.

Along with the integration, the CPU 101 records 1 for the swap space (/mnt1/swapfile) of the SATA hard disk drive 104 and the swap space (/mnt2/swapfile) of the SATA hard disk drive 105, records 2 for the swap space (/mnt3/swapfile) of the USB hard disk drive 106, and records 3 for the swap space (/mnt4/swapfile) of the NVMe solid state drive 107, in the item of integration ID in the benchmark result file 209 of FIG. 6.

After the integration, the CPU 101 handles the SATA hard disk drive 104, the SATA hard disk drive 105, the USB hard disk drive 106, and the NVMe solid state drive 107 as the individual auxiliary storage devices 121 on the basis of the integration ID. In other words, the CPU 101 handles the SATA hard disk drive 104 and the SATA hard disk drive 105 as a single auxiliary storage device 121, handles the USB hard disk drive 106 as a single auxiliary storage device 121, and handles the NVMe solid state drive 107 as a single auxiliary storage device 121.

Further, the CPU 101 confirms free spaces of a plurality of auxiliary storage devices 121 in which the swap spaces are integrated, and matches the maximum sizes of the swap spaces that can be obtained from the free spaces of the plurality of auxiliary storage devices 121. Specifically, the maximum size of the swap space of an auxiliary storage device 121 is adjusted to the smallest maximum size of the swap space of another auxiliary storage device 121. This is for matching the sizes of the swap spaces in the plurality of swap spaces combined into a single swap space for page allocation by a round-robin method. This contributes to good page allocation by a round-robin method.

In the example of the benchmark result file 209 of FIG. 6, the amount of free space of the SATA hard disk drive 104 is 125 GB, and the amount of free space of the SATA hard disk drive 105 is 100 GB. The maximum size of the swap space has a value obtained by multiplying the amount of free space by the swap size upper limit ratio in the various settings file 206 of FIG. 4. Therefore, the maximum size of the swap space (/mnt1/swapfile) of the SATA hard disk drive 104 is 112.5 GB, and the maximum size of the swap space (/mnt2/swapfile) of the SATA hard disk drive 105 is 90 GB.

As described above, in the processing of Step S102, the CPU 101 records 112.5 GB for the maximum size of the swap space (/mnt1/swapfile) of the SATA hard disk drive 104 in the benchmark result file 209.

In order to match the maximum sizes of the swap spaces of the SATA hard disk drive 104 and the SATA hard disk drive 105, in Step S105, the CPU 101 overwrites 112.5 GB, which is a larger maximum size of the swap space (/mnt1/swapfile) of the SATA hard disk drive 104, with 90 GB, which is a smaller maximum size of the swap space (/mnt2/swapfile) of the SATA hard disk drive 105.

In Step S106 of FIG. 3, the CPU 101 calculates an integration speed for write of each auxiliary storage device 121 after the integration of the swap spaces, and records the integration speed in the benchmark result file 209 of FIG. 6. The integration speed for write of a plurality of auxiliary storage devices 121 in which the swap spaces are integrated has a value obtained by adding the write speeds of the plurality of auxiliary storage devices 121 and multiplying the addition result by the performance estimation correction value in the various settings file 206 of FIG. 4. Further, the integration speed for write of a single auxiliary storage device 121 in which the swap space is not integrated has a value of the write speed of that auxiliary storage device 121.

In the benchmark result file 209 of FIG. 6, the integration speed for write of the SATA hard disk drive 104 and the SATA hard disk drive 105 is 300.8 (MiB/s). This value is obtained by adding the write speeds of the SATA hard disk drive 104 and the SATA hard disk drive 105 and multiplying the addition result by the swap size upper limit ratio, which is 0.9 (see FIG. 4).

Meanwhile, the integration speeds for write of the USB hard disk drive 106 and the NVMe solid state drive 107 are 80 (MiB/s) and 1500 (MiB/s), respectively, as shown in FIG. 6. The integration speeds for write of the USB hard disk drive 106 and the NVMe solid state drive 107 are equal to the write speeds thereof.

A higher degree of priority is given to a device having a higher speed. In other words, the CPU 101 sets a higher degree of priority such that the swap space of an auxiliary storage device 121 having a higher integration speed for write is preferentially utilized from among the plurality of auxiliary storage devices 121 identified on the basis of the integration ID, and then records the degree of priority in the benchmark result file 209 of FIG. 6.

In the example of the benchmark result file 209 of FIG. 6, the CPU 101 records 90 for the SATA hard disk drive 104 and the SATA hard disk drive 105 in which the swap spaces are integrated, records 80 for the USB hard disk drive 106, and records 100 for the NVMe solid state drive 107, in the item of degree of priority of the benchmark result file 209. Here, the degree of priority becomes higher as its value becomes larger.

In Step S108 of FIG. 3, the /etc/fstab file 207 (see FIG. 2) is updated on the basis of the benchmark result file 209 obtained after the processing of Step S107. FIG. 7 is a diagram showing contents regarding an exemplary swap space of the updated /etc/fstab file 207. The /etc/fstab file 207 of FIG. 7 describes "defaults, pri", which indicates the degree of priority, as <option> for each <file system>.

It is found from FIG. 7 that the swap space (/mnt1/swapfile) of the SATA hard disk drive 104 and the swap space (/mnt2/swapfile) of the SATA hard disk drive 105 both have a degree of priority of 90 (pri=90). It is found that the swap space (/mnt3/swapfile) of the USB hard disk drive 106 has a degree of priority of 80 (pri=80). It is found that the swap space (/mnt4/swapfile) of the NVMe solid state drive 107 has a degree of priority of 100 (pri=100).

In Step S109 of FIG. 3, the CPU 101 reboots Linux. In the reboot of Linux, the CPU 101 allocates the swap space for each of the SATA hard disk drive 104, the SATA hard disk drive 105, the USB hard disk drive 106, and the NVMe solid state drive 107 by using the swapon command 205 on the basis of the /etc/fstab file 207 updated in Step S108.

After the reboot of Linux, when the RAM 103 is short of space, the CPU 101 activates the swap spaces of the SATA hard disk drive 104, the SATA hard disk drive 105, the USB hard disk drive 106, and the NVMe solid state drive 107 on the basis of the degree of priority in the /etc/fstab file 207.

In the embodiment described above, in Steps S105 to S107, the CPU 101 integrates the swap space of the SATA hard disk drive 104 and the swap space of the SATA hard disk drive 105 and sets the degree of priority on the basis of the integration speed for write, but the embodiment is not limited thereto. The CPU 101 may omit the processing of integrating the swap space of the SATA hard disk drive 104 and the swap space of the SATA hard disk drive 105 and may set the degree of priority simply on the basis of the write speeds of the SATA hard disk drive 104, the SATA hard disk drive 105, the USB hard disk drive 106, and the NVMe solid state drive 107.

Effects

When using a plurality of auxiliary storage devices 121 having different speeds for write to the swap spaces, the calculator 100 of the embodiment automatically sets the degree of priority for the swap spaces of the plurality of auxiliary storage devices 121. This makes it possible even for a user having no knowledge of setting of the degree of priority for the swap spaces to efficiently utilize the system bus 102. Therefore, if a swap space is used when the RAM 103 is short of space, the time required for swap can be shortened, and the calculation processing can be finished quickly.

In other words, according to the embodiment, there are provided a calculator, a memory control method, and a memory control program that automatically set the degree of priority for swap spaces of a plurality of auxiliary storage devices when using the plurality of auxiliary storage devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calculator, which is connectable with an auxiliary storage device that can include a swap space and which performs predetermined processing, the calculator comprising:
    a main memory that temporarily stores a program and data necessary for the predetermined processing; and
    a processor that executes the program temporarily stored in the main memory to process the data, and causes the main memory to store the processed data, the processor being configured to
        search for the auxiliary storage device connected to the calculator,
        measure, if a plurality of auxiliary storage devices are found as the auxiliary storage device connected to the calculator as a result of the search, a write speed of each of the plurality of auxiliary storage devices,
        set a degree of priority to preferentially utilize a swap space of an auxiliary storage device having a higher write speed, and
        activate the swap space in accordance with the degree of priority, wherein
    when there are at least two auxiliary storage devices having a difference in write speed within a range of setting values, and there is at least one auxiliary storage device in addition to the at least two auxiliary storage devices,
    the processor is further configured to combine swap spaces of the at least two auxiliary storage devices into a single swap space for page allocation by a round-robin method.

2. The calculator according to claim 1, wherein
the processor is configured to combine the swap spaces of the at least two auxiliary storage devices into a single swap space to use the at least two auxiliary storage devices as a single integrated auxiliary storage device.

3. The calculator according to claim 2, wherein
the processor is configured to
    calculate a write speed of the integrated auxiliary storage device, and
    set the degree of priority to be higher for the swap space of the auxiliary storage device having a higher write speed to be preferentially utilized, from among a plurality of auxiliary storage devices including the integrated auxiliary storage device as a single auxiliary storage device.

4. The calculator according to claim 1, wherein
the processor is further configured to
    confirm free spaces of the at least two auxiliary storage devices, and
    match sizes of swap spaces that can be obtained from the free spaces of the at least two auxiliary storage devices.

5. A memory control method for a calculator connectable with an auxiliary storage device that can include a swap space, the memory control method comprising:
    searching for the auxiliary storage device connected to the calculator;
    measuring, if a plurality of auxiliary storage devices are found as the auxiliary storage device connected to the calculator as a result of the search, a write speed of each of the plurality of auxiliary storage devices;
    setting a degree of priority to preferentially utilize a swap space of an auxiliary storage device having a higher write speed;
    activating the swap space in accordance with the degree of priority; and
    when there are at least two auxiliary storage devices having a difference in write speed within a range of setting values, and there is at least one auxiliary storage device in addition to the at least two auxiliary storage devices, combining swap spaces of the at least two auxiliary storage devices into a single swap space for page allocation by a round- robin method.

6. The memory control method according to claim 5, further comprising:
    combining the swap spaces of the at least two auxiliary storage devices into a single swap space to use the at least two auxiliary storage devices as a single integrated auxiliary storage device.

7. The memory control method according to claim 6, further comprising:
    calculating a write speed of the integrated auxiliary storage device; and
    setting the degree of priority to be higher for the swap space of the auxiliary storage device having a higher write speed to be preferentially utilized, from among a plurality of auxiliary storage devices including the integrated auxiliary storage device as a single auxiliary storage device.

8. The memory control method according to claim 5, further comprising:
    confirming free spaces of the at least two auxiliary storage devices; and
    matching sizes of swap spaces that can be obtained from the free spaces of the at least two auxiliary storage devices.

* * * * *